United States Patent
Boss et al.

(10) Patent No.: US 11,276,047 B2
(45) Date of Patent: Mar. 15, 2022

(54) DETERMINING AND DISTRIBUTING FUEL CREDITS USING A COMPUTER-BASED IMMUTABLE LEDGER

(71) Applicant: KYNDRYL, INC., New York, NY (US)

(72) Inventors: Gregory J. Boss, Saginaw, MI (US); Robert Roy Paar, Ridgewood, NY (US); Jeremy R. Fox, Georgetown, TX (US); Kelley Anders, East New Market, MD (US)

(73) Assignee: KYNDRYL, INC., New York, NY (US)

( * ) Notice: Subject to any disclaimer, the term of this patent is extended or adjusted under 35 U.S.C. 154(b) by 524 days.

(21) Appl. No.: 16/245,958

(22) Filed: Jan. 11, 2019

(65) Prior Publication Data

US 2020/0226559 A1    Jul. 16, 2020

(51) Int. Cl.
  *G06Q 20/10*  (2012.01)
  *H04L 9/06*  (2006.01)
  *G06F 16/23*  (2019.01)

(52) U.S. Cl.
  CPC ........... *G06Q 20/102* (2013.01); *G06F 16/23* (2019.01); *H04L 9/0618* (2013.01); *G06Q 2220/00* (2013.01); *H04L 2209/38* (2013.01)

(58) Field of Classification Search
  CPC ............ G06Q 20/102; G06Q 2220/00; G06Q 20/145; G06F 16/23; H04L 9/0618;
  (Continued)

(56) References Cited

U.S. PATENT DOCUMENTS 9,849,364 B2    12/2017   Tran
2006/0218056 A1*  9/2006   Dickman ............. G06Q 10/087
                                                     705/28

(Continued)

FOREIGN PATENT DOCUMENTS

WO    2017196821 A1    11/2017
WO    2017221052 A1    12/2017

OTHER PUBLICATIONS

Y. Hanada, L. Hsiao and P. Levis, "Smart Contracts for Machine-to-Machine Communication: Possibilities and Limitations," 2018 IEEE International Conference on Internet of Things and Intelligence System (IOTAIS), 2018, pp. 130-136, doi: 10.1109/IOTAIS.2018.8600854. (Year: 2018).*

(Continued)

*Primary Examiner* — Resha Desai
*Assistant Examiner* — Carter P Brockman
(74) *Attorney, Agent, or Firm* — Erik Swanson; Andrew M. Calderon; Roberts Calderon Safran & Cole P.C.

(57) ABSTRACT

A computer-implemented method including: creating, by a computer device, a database record for a user in a computer-based immutable ledger; updating, by the computer device, the database record with a beginning amount of fuel when the user rents a vehicle; receiving, by the computer device, fuel purchase information from a fuel dispenser at a filling station; updating, by the computer device, the database record with the fuel purchase information; updating, by the computer device, the database record with an ending amount of fuel when the user returns the vehicle; determining, by the computer device, an amount of overpayment for fuel by the user; and updating, by the computer device, the database record with a credit based on the determined amount of overpayment.

19 Claims, 5 Drawing Sheets

(58) Field of Classification Search
CPC ............... H04L 2209/38; H04L 9/0891; H04L 2209/84; H04L 9/3239
See application file for complete search history.

(56) References Cited

U.S. PATENT DOCUMENTS

| | | | |
|---|---|---|---|
| 2008/0015908 A1* | 1/2008 | Ramseyer | G07F 17/0014 705/5 |
| 2014/0278608 A1* | 9/2014 | Johnson | G01S 19/51 705/5 |
| 2015/0348169 A1 | 12/2015 | Harris | |
| 2016/0071082 A1* | 3/2016 | Driscoll | G06Q 20/145 705/13 |
| 2017/0046652 A1 | 2/2017 | Haldenby | |
| 2017/0046669 A1 | 2/2017 | Chow | |
| 2017/0171178 A1* | 6/2017 | Reynders | G06Q 20/4014 |
| 2017/0232300 A1 | 8/2017 | Tran | |
| 2018/0241228 A1* | 8/2018 | Kemppainen | H02J 13/00007 |
| 2020/0236175 A1* | 7/2020 | Wang | G06Q 20/3278 |

OTHER PUBLICATIONS

Anonymous, "IoT—and Blockchain-Enabled Preauthorized Fuel Purchasing," IP.com No. IPCOM000253766D, May 2, 2018, 4 pages.

Zion Market Research, "Car Rental Industry Share & Trends Will Reach $124.56 Billion Market by 2022," https://globenewswire.com/news-release/201/12/20/1266919/0/en/Car-Rental-Industry-Share-Trends-Will-Reach-124-56-Billion-Market-by-2022.html, Dec. 20, 2017, 5 pages.

Pittaway, "Booming demand fuels worldwide car rental market," https://www.globalfleet.com/en/analysis/booming-demand-fuels-worldwide-car-rental-market, Accessed Nov. 18, 2018, 8 pages.

de Meijer, "Blockchain may fuel the energy industry," https://www.linkedin.com/pulse/blockchain-may-fuel-energy-industry-carlo-r-w-de-meijer/, Nov. 22, 2016, 6 pages.

Harley, "Achieving Climate Neutral Fuel via Blockchain and Smart IoT," https://medium.com/earthtokens/achieving-climate-neutral-fuel-via-blockchain-and-smart-iot-6991b5c30217, Oct. 19, 2017, 4 pages.

Fuelman, "Apply Now for a Fuelman Fuel Card," https://www.fuelman.com/apply-for-card, Accessed Nov. 18, 2018, 4 pages.

Carchex, ""Stump Pat" Episode 6: Will Regular Or Premium Gas Extend A Car's Life," https://www.carchex.com/blog/stump-pat-regular-or-permium-gas/, Sep. 23, 2011, 4 pages.

Biello, "Fact or Fiction?: Premium Gasoline Delivers Premium Benefits to Your Car," https://www.scientificamerican.com/article/fact-or-fiction-premium-g/, Jan. 18, 2007, 6 pages.

Mell et al., "The NIST Definition of Cloud Computing", NIST, Special Publication 800-145, Sep. 2011, 7 pages.

Sean, "If you understand Hash Functions, you'll understand Blockchains," https://decentralize.today/if-you-understand-hash-functions-youll-understand-blockchains-9088307b745d, Nov. 29, 2016, 3 pages.

Antonylewis2015, "A gentle introduction to immutability of blockchains," https://bitsonblocks.net/2016/02/29/a-gentle-introduction-to-immutability-of-blockchains/, Feb. 29, 2016, 8 pages.

* cited by examiner

DETERMINING AND DISTRIBUTING FUEL CREDITS USING A COMPUTER-BASED IMMUTABLE LEDGER

BACKGROUND

The present invention relates generally to computer-based immutable ledgers such as blockchains and, more particularly, to determining and distributing fuel credits in a rental car return using a computer-based immutable ledger.

Rental car companies usually offer a renter the option of paying for a full tank of fuel (e.g., gasoline) when the renter receives the rental car. In this scenario, the renter need not refill the fuel tank of the rental car when the renter returns the rental car to the rental company.

SUMMARY

In a first aspect of the invention, there is a computer-implemented method including: creating, by a computer device, a database record for a user in a computer-based immutable ledger; updating, by the computer device, the database record with a beginning amount of fuel when the user rents a vehicle; receiving, by the computer device, fuel purchase information from a fuel dispenser at a filling station; updating, by the computer device, the database record with the fuel purchase information; updating, by the computer device, the database record with an ending amount of fuel when the user returns the vehicle; determining, by the computer device, an amount of overpayment for fuel by the user; and updating, by the computer device, the database record with a credit based on the determined amount of overpayment.

In another aspect of the invention, there is a computer program product including a computer readable storage medium having program instructions embodied therewith. The program instructions are executable by a computer device to cause the computer device to: create a database record for a user in a computer-based immutable ledger; update the database record with a beginning amount of fuel when the user rents a vehicle; receive fuel purchase information from a fuel dispenser at a filling station; update the database record with the fuel purchase information; update the database record with an ending amount of fuel when the user returns the vehicle; determine an amount of overpayment for fuel by the user; and update the database record with a credit based on the determined amount of overpayment.

In another aspect of the invention, there is system including a processor, a computer readable memory, and a computer readable storage medium. The system includes: program instructions to create a database record for a user in a computer-based immutable ledger; program instructions to update the database record with a beginning amount of fuel when the user rents a vehicle; program instructions to receive fuel purchase information from a fuel dispenser at a filling station; program instructions to update the database record with the fuel purchase information; program instructions to update the database record with an ending amount of fuel when the user returns the vehicle; program instructions to determine an amount of overpayment for fuel by the user; and program instructions to update the database record with a credit based on the determined amount of overpayment. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to computer-based immutable ledgers such as blockchains and, more particularly, to determining and distributing fuel credits in a rental car return using a computer-based immutable ledger. According to aspects of the invention include a rental car refueling reimbursement system where the system uses common immutable ledger of vehicle fuel refilling events and uses that information to calculate a personal fuel credit back to the renter and apportion the cost of the refueling between the renter, the rental service provider, and the filling station. In a particular embodiment, the immutable ledger is a blockchain; however, aspects of the invention are not limited to using a blockchain and, instead, implementations of the invention may use other types of immutable ledger in preforming the processes described herein.

When a customer rents a vehicle, they are often given the option to prepay to refuel the vehicle when they return the rental to the vendor (referred to herein as a rental service provider). If the customer elects to purchase this option, they are often left with some value remaining in the tank at the time they return the vehicle. More specifically, the customer who prepays for a full tank of fuel with the rental vehicle is confined to one of the following four outcomes: (i) the customer refuels the rental vehicle during the rental period and returns the vehicle with some fuel remaining in the tank; (ii) the customer refuels the rental vehicle during the rental period and returns the vehicle on empty; (iii) the customer does not refuel the rental vehicle during the rental period and returns the vehicle on empty; (iv) the customer does not refuel the rental vehicle during the rental period and returns the vehicle with some fuel remaining in the tank. In outcomes ii and iii, the customer got the full value of the fuel for which they prepaid. However, in outcomes i and iv, the customer loses some amount of value of the fuel for which they prepaid. From the customer point of view, the value remaining in the tank for the fuel that has already been paid for should be returned to the customer's account, either to be paid out in cash or as a credit for refueling other vehicles, or carried over to the next time the customer rents a car. From the rental service provider point of view, it is more beneficial for customers to return vehicles with full gas tanks despite the margin made on prepaid tanks, as this speeds the rental process and reduces downtime for refueling and maintenance.

Aspects of the invention address these shortcomings by providing a methodology by which renters, rental service providers, and filling stations all benefit from having a renter fill the tank before returning a vehicle to the rental company. Implementations of the invention provide a method by which a renter who prepays for a full tank of fuel but doesn't use that entire tank is reimbursed for an amount of fuel in the tank when the renter returns the vehicle. In embodiments, the method involves using a blockchain to establish a common immutable ledger of vehicle fuel refilling events and uses that information to calculate a personal fuel credit to the renter and apportion the cost of the refueling between the three parties.

In some embodiments, the methodology involves a vehicle's fuel gauge and/or gas tank, instrumented with an IoT (Internet of Things) device which allows the vehicle to communicate its fuel status and subsequent fuel requirement(s) to a cloud-based service. In other embodiments, the pumps at filling stations are equipped with an IoT device that communicates fuel purchase information to the cloud-based service. In embodiments, the fuel purchase information includes: an amount of fuel dispensed to a vehicle; an amount paid for the fuel dispensed; a unique identifier of the user who paid for the fuel; a unique identifier of the vehicle; and a unique identifier of the private enterprise that owns the filling station.

According to aspects of the invention, when all the additions of fuel into the vehicle are recorded as transactions on a blockchain, the blockchain becomes a ledger of fuel value which can be used to facilitate payments or credits between the parties. The blockchain in essence creates a personal fuel account for the customer, whereby a person could track all the fuel they own across all of their vehicles with one account. In embodiments, this can include gas put into rental vehicles as well, so that if a renter prepays for a tank and returns a vehicle with fuel remaining in the tank, the renter does not lose the value of the remaining fuel when returned to the rental car company.

Implementations of the invention thus provide a method to log fuel purchases for a rental vehicle in an immutable ledger (such as a blockchain). In embodiments, the method includes calculating overpayments by a renter who voluntarily fills the rental vehicle with fuel, including both renter who prepay and renters who decline prepayment. In embodiments, the method includes determining a proportional three way disbursement of overpayment credits between the renter, the rental service provider, and the filling station, involving future personal gas credits for the renter.

In accordance with an aspect of the invention, there is a method in which a user creates an account with the system, e.g., via a mobile application or a web interface, and in response the system generates a blockchain instance to track one or many vehicles for this user. In this method, the user enters details of their vehicles into the account (e.g., make, model, year, VIN, etc.). In this method, using data from the vehicle, the blockchain is updated with information such as current total and trip mileage, usage data (e.g., braking behavior, acceleration behavior, etc.), fuel level of each vehicle, etc. In this method, when the user rents a vehicle from a rental service provider and prepays for a full tank of fuel in the rental vehicle, the system updates the user's blockchain with the value of this full tank of fuel. In this method, when the user chooses to prepay for a full fuel tank (e.g., pre-loading the tank with a set value), the value of the tank is tracked on the blockchain and, when the vehicle is returned, the value of the fuel remaining in the tank is credited to the user. In this method, the user can then transfer this credit value to another rental with the same rental service provider. Alternatively, the user can transfer this credit value to payment for fading fuel to the user's personal vehicle at a participating filling station, in which case the value is transfer from the rental service provider to the filling station. Alternatively, the rental service provider may hold the value of the tank up front, and then deduct the value of fuel consumed by the user when the transaction is completed.

In this method, if the user chooses not to prepay for a full tank of fuel and does not refill the vehicle prior to returning the vehicle, the rental service provider charges the refueling cost to the user's blockchain account instead of to the user's credit card. In this manner, any remaining unredeemed value on the user's blockchain account is used to pay the rental service provide prior to charging the user's credit card for any overage. In embodiments, the user can access and obtain a report (e.g., visualization) of the user's gas credits and fuel volumes in their blockchain.

In an alternative embodiment, a third party service provider uses immutable ledgers (e.g., blockchain) to manage individual consumer accounts. In this embodiment, the third party service provider enters contractual agreements with rental service providers to manage the fuel in the tanks of its fleet of vehicles. In this embodiment, individual consumers interface directly with the third party service provider to pay for only what was used instead of paying up front for a whole tank directly from the rental service provider. In this manner, the user is provided with a pay as you go approach to fuel consumption for rental vehicles.

Embodiments of the invention improve the technology of rental car fuel monitoring by providing users with automated tools that determine and distribute fuel credits in a rental car return using a computer-based immutable ledger. Embodiments of the invention employ an unconventional arrangement of steps including: create a database record for a user in a computer-based immutable ledger; update the database record with a beginning amount of fuel when the user rents a vehicle; receive fuel purchase information from a fuel dispenser at a filling station; update the database record with the fuel purchase information; update the database record with an ending amount of fuel when the user returns the vehicle; determine an amount of overpayment for fuel by the user; and update the database record with a credit based on the determined amount of overpayment. The steps themselves are unconventional, and the combination of the steps is also unconventional. Embodiments of the invention also utilize elements and/or techniques that are necessarily rooted in computer technology, including computer based immutable ledgers, in particular blockchains.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
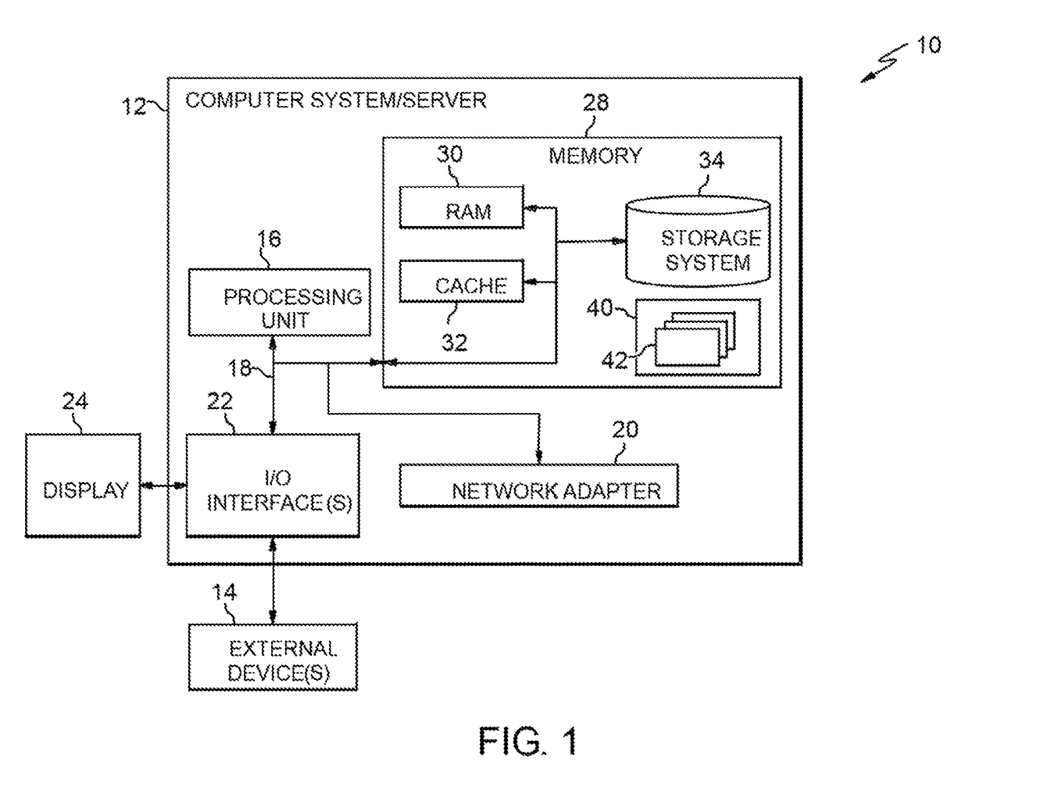
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
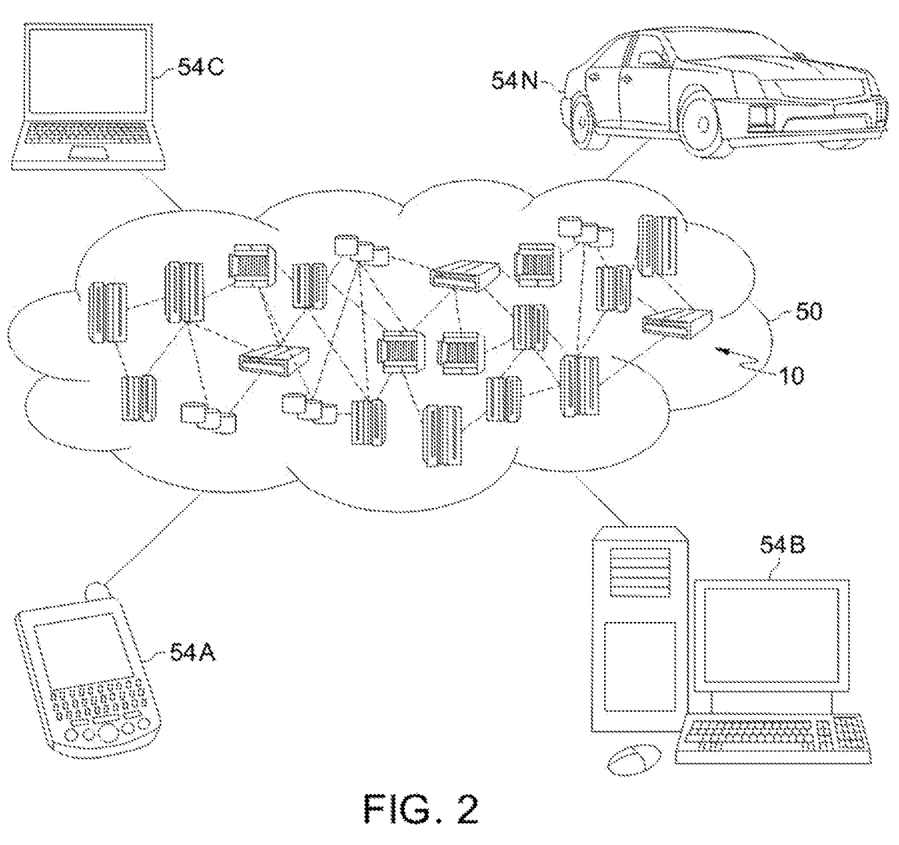
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
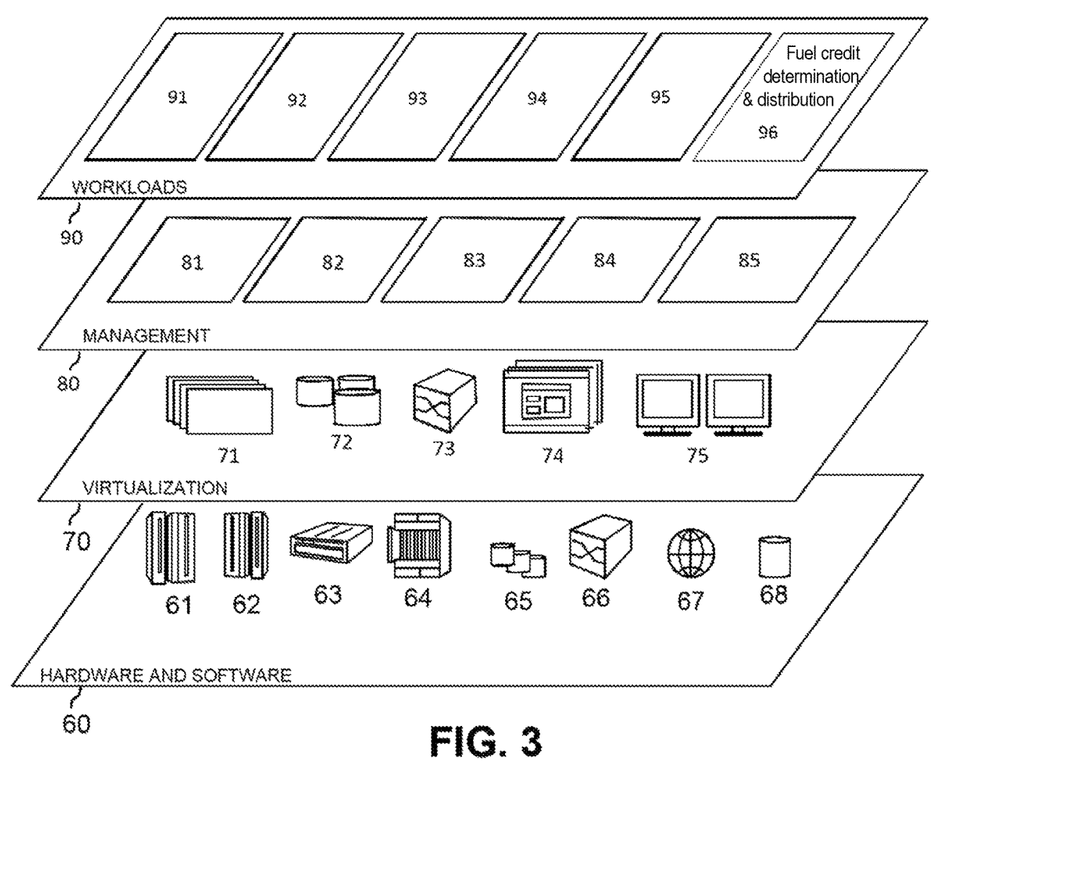
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fuel credit determination and distribution 96.

Implementations of the invention may include a computer system/server 12 of FIG. 1 in which one or more of the program modules 42 are configured to perform (or cause the computer system/server 12 to perform) one of more functions of the fuel credit determination and distribution 96 of FIG. 3. For example, the one or more of the program modules 42 may be configured to: create a database record for a user in a computer-based immutable ledger; update the database record with a beginning amount of fuel when the user rents a vehicle; receive fuel purchase information from a fuel dispenser at a filling station; update the database record with the fuel purchase information; update the database record with an ending amount of fuel when the user returns the vehicle; determine an amount of overpayment for fuel by the user; and update the database record with a credit based on the determined amount of overpayment.

Figure 4:
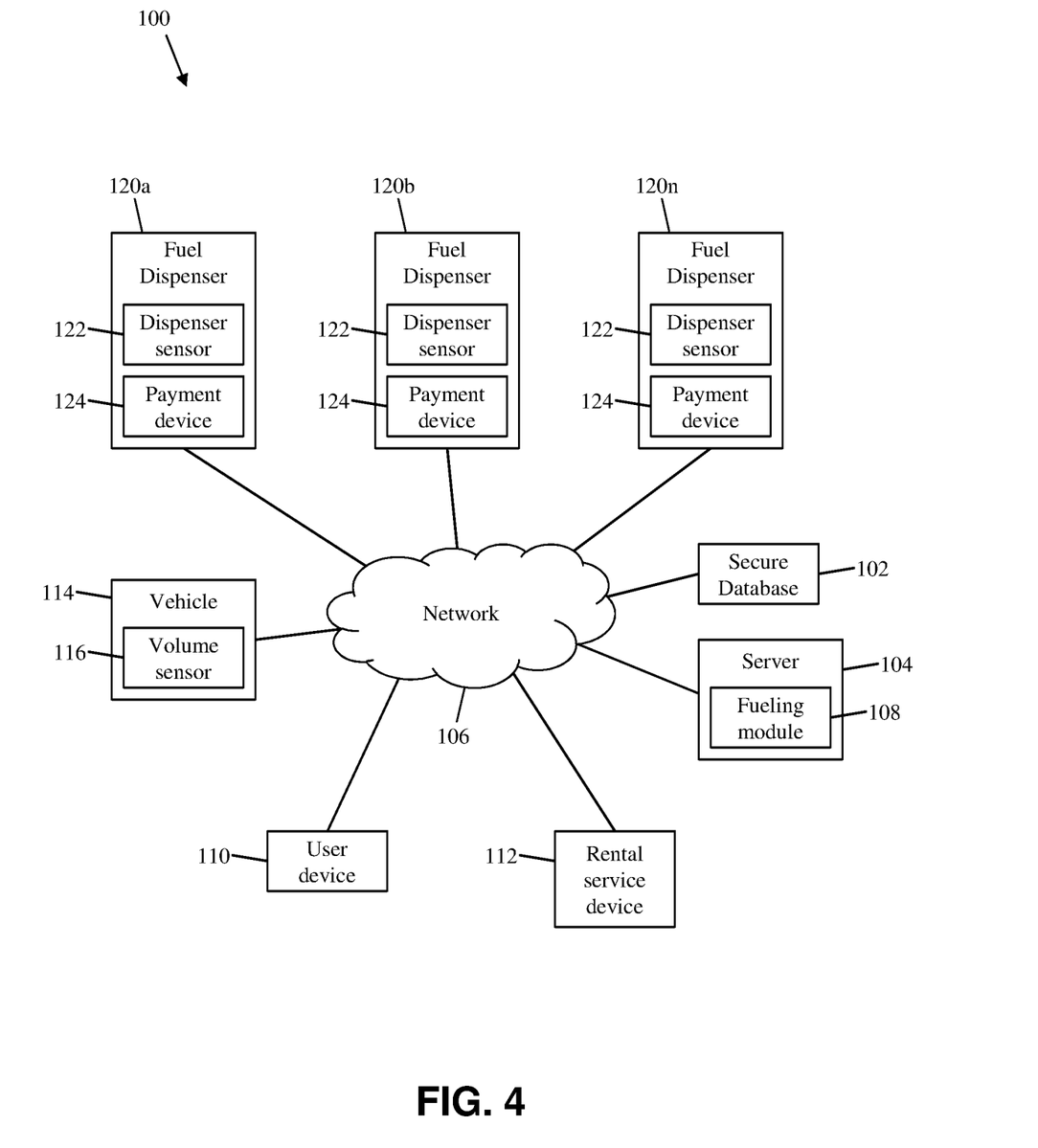
FIG. 4 shows a block diagram of an exemplary environment in accordance with aspects of the invention.

FIG. 4 shows a block diagram of an exemplary environment 100 in accordance with aspects of the invention. In embodiments, the environment 100 includes a secure database 102 and a server 104 connected to the network 106. According to aspects of the invention, the secure database 102 comprises an immutable ledger such as a blockchain, e.g., a distributed blockchain database. For example, the secure database 102 may comprise data storage on plural computer devices connected in a distributed network environment that function as a distributed ledger of the data. In a blockchain implementation, immutability of the secure database 102 is provided by each block of the blockchain including a digital fingerprint (e.g., a hash value) that is derived from the contents of that block, and each block also including the previous block's digital fingerprint (e.g., the previous block's hash value) as part of its data. Implementations of the invention are not limited to a blockchain, however, and the secure database 55 may comprise other types of immutable ledgers.

The network 106 comprises a communication network such as a LAN, WAN, or the Internet, or a combination of such communication networks. In embodiments, the network 106 comprises a cloud computing environment 50 as described with respect to FIG. 2, and the secure database 102 and the server 104 each comprises one or more nodes 10 in the cloud computing environment.

The server 104 comprises a computer device including one or more components of the computer system/server 12 of FIG. 1. In embodiments, the server 104 comprises a fueling module 108 that is configured to perform one or more of the functions described herein. The fueling module 108 may include one or more program modules 42 as described with respect to FIG. 1. In embodiments, separate modules of the server 104 may be integrated into a single module. Additionally, or alternatively, a single module of the server 104 may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Still referring to FIG. 4, in embodiments, the environment 100 includes a user device 110 of a user that rents a vehicle (e.g., a rental car) from a rental service. The user device 110 is a computer device such as a laptop computer, desktop computer, tablet computer, or smartphone, and may include one or more components of the computer system/server 12 of FIG. 1. In the cloud embodiment, the user device 110 comprises a local computing device (e.g., similar to devices 54A-N of FIG. 2) used by a cloud consumer.

In embodiments, the environment 100 includes a rental service device 112 of the rental service provider that rents the vehicle (e.g., a rental car) to the user. The rental service device 112 is a computer device such as a laptop computer, desktop computer, tablet computer, or smartphone, and may include one or more components of the computer system/server 12 of FIG. 1. In the cloud embodiment, the rental service device 112 comprises a local computing device (e.g., similar to devices 54A-N of FIG. 2) used by a cloud consumer.

Still referring to FIG. 4, in embodiments, the environment 100 includes a vehicle 114 which represents the vehicle (e.g., a rental car) rented by the user from the rental service provider. In some embodiments, the vehicle 114 comprises an onboard computer and communication system such that the vehicle 114 has communicative connectivity with the network 106. In some embodiments, the vehicle 114 comprises a volume sensor 116 in the fuel tank of the vehicle. The volume sensor 114 may comprise, for example, a fill level sensor that detects a level of fuel in the fuel tank and whose output is calibrated to provide a measure of volume of fuel in the fuel tank. In some embodiments, the vehicle 114 reports the volume of fuel in the fuel tank to the server 104 via the network 106. In some embodiments, the vehicle 114 reports the volume of fuel in the fuel tank to the rental service device 112, which in turn reports this information to the server 104 via the network 106.

With continued reference to FIG. 4, in embodiments, the environment 100 includes plural fuel dispensers 120a, 120b, . . . , 120n, each comprising a dispenser sensor 122 and a payment device 124. Each fuel dispenser 120a-n comprises a machine at a filling station that is used to pump fuel (e.g., gasoline, petrol, diesel, etc.) into vehicles such as vehicle 114. In accordance with aspects of the invention, the dispenser sensor 122 is a sensor that measures an amount (e.g., volume) of fuel that is dispensed by the fuel dispenser to a vehicle. For example, the dispenser sensor 114 may comprise a flow meter whose output is calibrated to provide a measure of the volume of fuel dispensed per unit of time. In accordance with aspects of the invention, the payment device 124 is an electronic payment device such as an electronic point of sale device such as a credit card reader. In this manner, the user may provide payment via the payment device 124 when the user uses the fuel dispenser to put fuel into the vehicle 114.

In implementations, different ones of the plural fuel dispensers 120a-n are owned and operated by different private enterprises. In accordance with aspects of the invention, when the user uses one of the fuel dispensers (e.g., fuel dispenser 120a) to add fuel to the vehicle 114, the fuel dispenser transmits information to the server 104 that the server 104 uses to update the secure database 102. In embodiments, the information transmitted by the fuel dispenser includes: amount of fuel dispensed; amount paid for the fuel dispensed; a unique identifier of the user; a unique identifier of the vehicle 114; and a unique identifier of the private enterprise that owns the fuel dispenser. In embodiments, the server 104 updates the secure database 102 by adding this information to a data record of the secure database 102. In the blockchain embodiment, the server 104 creates a new block on a blockchain associated with the user, wherein the new block includes this information, a new hash value derived from this information, and the hash value of the previous block in the user's blockchain. In this manner, the secure database 102 is updated with this information each time the user adds fuel to the vehicle 114, regardless of which one of the fuel dispensers 120a-n the user uses to add fuel to the vehicle 114.

In embodiments, the fuel dispenser (e.g., fuel dispenser 120a) determines the unique identifier of the vehicle 114 using automated techniques. In one example, the unique identifier of the vehicle is stored electronically in a key fob of the vehicle 114, and the fuel dispenser uses wireless communication/detection to obtain the unique identifier of the vehicle from the key fob. In another example, the fuel dispenser includes one or more cameras that capture an image of the license plate of the vehicle, and the fuel dispenser uses the license plate state and number as the unique identifier of the vehicle.

In embodiments, the fuel dispenser (e.g., fuel dispenser 120a) determines the unique identifier of the user using automated techniques. In one example, the unique identifier of the user is the credit card number of the card the user uses to pay for the fuel at the payment device 124. In another example, the payment device 124 accepts payment from the user device 110, e.g., using a pay-at-the-pump app on the user device 110, and the fuel dispenser obtains the unique identifier of the user from the registration data of the app on the user device 110.

Figure 5:
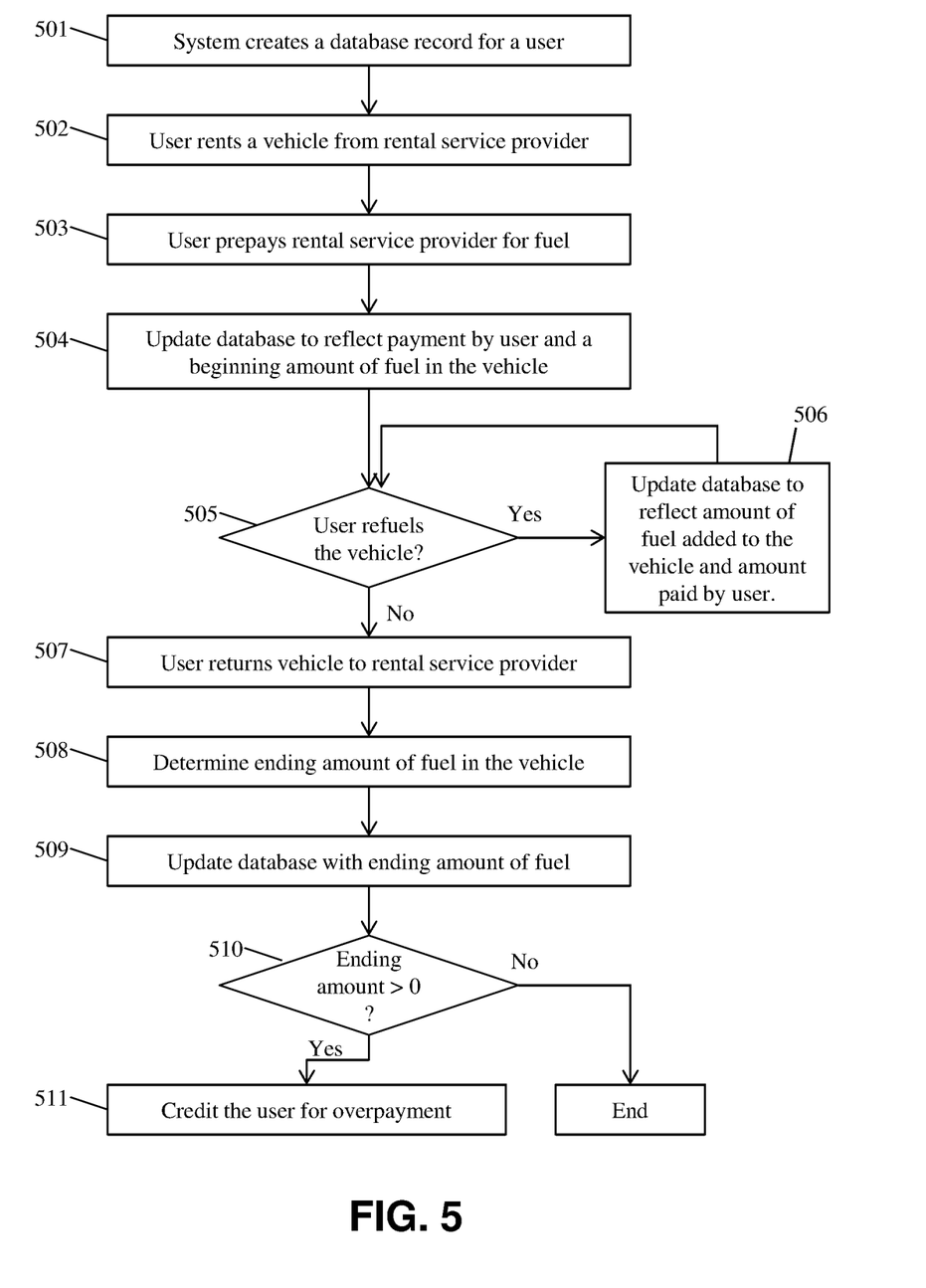
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the system creates a database record for a user. In embodiments, the user users their user device 110 to register with (e.g., create an account) with the service. Registration may be performed using a mobile application or a web interface presented via the user device 110. In embodiments, registration includes the user entering user vehicle information such as make, model, year, and VIN of one or more vehicles the user wishes to associate with the account. In accordance with aspects of the invention, in response to receiving the user registration, the fueling module 108 creates a record for the user in the secure database. In embodiments, the record is part of an immutable ledger. In a particular embodiment, the record is a blockchain instance that is generated for this particular user.

At step 502, the user rents a vehicle from a rental service provider. At step 503, the user prepays the rental service provider (e.g., at the time of the rental of step 502) for an amount of fuel (e.g., a full tank) in the rental vehicle (e.g., vehicle 114). Steps 502 and 503 may be performed in a conventional manner.

At step 504, the system updates the database to reflect the amount paid by the user at step 503. In embodiments, after receiving the prepayment from the user, the rental service device 112 transmits data to the fueling module 108, which updates the database 102 to reflect the amount paid by the user. In the blockchain environment, step 504 includes the fueling module 108 adding a block to the user's blockchain, the new block including at least information defining the amount paid at step 503, a new hash value derived from the new information, and a hash value of the previous block in the user's blockchain.

According to aspects of the invention, step 504 includes updating the database 102 to reflect an amount of fuel in the tank of the vehicle 114 at the time of the rental (e.g., a beginning amount). In embodiments, the volume sensor 116 of the vehicle 114 reports the volume of fuel in the fuel tank of the vehicle 114 to the rental service device 112, which reports this beginning amount of fuel and the user's unique ID to the fueling module 108. The fueling module 108 includes this beginning amount of fuel in the database record with the amount prepaid by the user (e.g., at step 503). In this manner, the system updates the database 102 to store information defining: an amount of money the user prepaid for fuel; and a beginning amount of fuel in the vehicle 114 at the time of the rental. In the blockchain environment, the block added to the blockchain at step 504 would additionally include this information about the beginning amount of fuel in the vehicle 114 at the time of the rental.

In embodiments, the amount of prepay by the user at step 503 is determined based on the beginning amount of fuel in the tank of the vehicle 114, e.g., as reported by the volume sensor 116. For example, the rental service provider device 112 may obtain the beginning amount of fuel from the volume sensor 116, and then charge the user for the exact amount of fuel reported by the volume sensor 116. The beginning amount of fuel reported by the volume sensor 116 and prepaid for by the user are thus equal. In this manner, implementations of the invention may be used with any beginning amount of fuel in the rental vehicle 114, and are not limited to prepayments for a full tank.

After step 504, the user drives the vehicle 114 for the rental period. As indicated at block 505, the user might or might not refuel the vehicle 114 during the rental period.

In the event the user does refuel the vehicle, then at step 506 the system updates the database to reflect the amount of fuel added to the vehicle and the amount paid for the fuel by the user. In embodiments, as described with respect to FIG. 4, the IoT device 125 of the fuel dispenser (e.g., fuel dispenser 120a) reports information about the fuel transaction to the fueling module 108. In embodiments, the information includes: amount of fuel dispensed; amount paid for the fuel dispensed; a unique identifier of the user; a unique identifier of the vehicle 114; and a unique identifier of the private enterprise that owns the fuel dispenser. The fueling module 108 then updates the user's record in the database 102 to reflect this information. In the blockchain embodiment, step 506 includes the fueling module 108 adding a block to the user's blockchain, the new block including this information reported by the IoT device 125 of the fuel dispenser, a new hash value derived from the new information, and a hash value of the previous block in the user's blockchain.

The user might refuel the vehicle 114 plural times during the rental period. In this situation, the system performs step 506 for each respective time the user adds fuel to the vehicle 114 at one of the fuel dispensers 120a-n.

At step 507, the user returns the vehicle 114 to the rental service provider. At step 508, the system determines an ending amount of fuel in the vehicle 114. In embodiments, the volume sensor 116 reports the amount of fuel currently in the vehicle 114 (e.g., the ending amount) to the rental service device 112, which reports this amount of fuel and the user's unique ID to the fueling module 108.

At step 509, the system updates the database with the ending fuel amount. In embodiments, the fueling module 108 updates the user's record in the database 102 to include the ending amount determined at step 507. In the blockchain embodiment, step 507 includes the fueling module 108 adding a block to the user's blockchain, the new block including this ending amount of fuel in the vehicle 114, a new hash value derived from the new information, and a hash value of the previous block in the user's blockchain.

At step 510, the system determines whether the ending amount (from step 508) is greater than zero. On the one hand, if the ending amount of fuel in the tank of the vehicle 114 is zero, then the fuel tank is empty and the user received the full amount of value for the fuel for which they prepaid at step 503. In this situation, the process ends. On the other hand, if the ending amount of fuel in the tank of the vehicle 114 is greater than zero, then the user returned the vehicle with some fuel in the tank and did not receive the full value of the fuel they prepaid for at step 503. In this situation, at step 511 the system credits the user for the overpayment. In embodiments, the fueling module 108 determines a monetary amount for the ending amount of fuel and adds this monetary amount as a credit to the user's record in the database 102. The user may subsequently use this credit to pay for services at participating service providers. In one example, the user uses this credit defined in their database record to apply toward payment to the same rental service provider for another subsequent rental. In another example, the user uses this credit defined in their database record to apply toward payment to a participating filling station when the user adds fuel to the user's personal vehicle at the filling station using one of the fuel dispensers 120a-n. In both examples, when the user uses the credit to apply toward payment for a subsequent service, the system updates the user's database record to reflect that this credit has been used and is no longer available for the user.

In an embodiment, a portion of the credit (of step 511) is provided to the private entity that owns the filling station where the user added fuel to the vehicle 114 during the rental period, with the remainder of the credit being provided to the user as described above. In this manner, the filling station owner is compensated for participating in the service program (e.g., for reporting data to the system at step 506). In embodiments, the portion is predefined, e.g., a predefined percentage. In embodiments, when the user added fuel to the vehicle at plural different filling stations, this portion of the overpayment credit is divided amongst the plural different filling stations, e.g., equally, proportional to the amount of fuel the user purchased at each respective station, or by some other predefined metric. In embodiments, the portion is provided to the filling station by updating a record in the database 102 associated with the filling station.

In another embodiment, a first portion of the credit (of step 511) is provided to the private entity that owns the filling station where the user added fuel to the vehicle 114 during the rental period, a second portion of the credit (of step 511) is provided to the rental service provider, and the remainder of the credit being provided to the user as described above. In this manner, the filling station owner and the rental service provider are compensated for participating in the service program. In embodiments, the first portion and the second portion are predefined, e.g., predefined percentages. In embodiments, when the user added fuel to the vehicle at plural different filling stations, the first portion of the overpayment credit is divided amongst the plural different filling stations, e.g., equally, proportional to the amount of fuel the user purchased at each respective station, or by some other predefined metric. In embodiments, the portion is provided to the filling station by updating a record in the database 102 associated with the filling station, and the portion is provided to the rental service provider by updating a record in the database 102 associated with the rental service provider.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining and distributing fuel credits in a rental car return using a computer-based immutable ledger, comprising:

creating, by a computer device, a database record for a user in the computer-based immutable ledger, wherein the computer-based immutable ledger comprises a blockchain that is personal to the user;

updating, by the computer device, the database record with a beginning amount of fuel when the user rents a vehicle;

receiving, by the computer device, fuel purchase information from a fuel dispenser at a filling station;

updating, by the computer device, the database record with the fuel purchase information;

updating, by the computer device, the database record with an ending amount of fuel when the user returns the vehicle;

determining, by the computer device, an amount of overpayment for fuel by the user;

updating, by the computer device, the database record with a credit based on the determined amount of overpayment;

determining a portion of the overpayment to be credited to the filling station;

updating a database record of the filling station with the determined portion of the overpayment; and deriving a hash value from the fuel purchase information, wherein the updating the database record with the fuel purchase information comprises adding a new block to the blockchain of the user, the new block including:

the fuel purchase information;

the hash value derived from the fuel purchase information; and a hash value of a previous block in the blockchain of the user.

2. The method of claim 1, wherein the fuel purchase information is received from an Internet of Things device connected to the fuel dispenser at the filling station.

3. The method of claim 2, wherein the fuel purchase information includes: an amount of fuel dispensed to the vehicle; an amount paid for the fuel dispensed; a unique identifier of the user who paid for the fuel; a unique identifier of the vehicle; and a unique identifier of the filling station.

4. The method of claim 1, further comprising:
receiving a request to view the database record from a user device of the user; and
transmitting data to the user device to display the database record.

5. The method of claim 1, wherein:
the updating the database record with the beginning amount of fuel comprises adding a new block to the blockchain;
the updating the database record with the fuel purchase information comprises adding a new block to the blockchain;
the updating the database record with the ending amount of fuel when the user returns the vehicle comprises adding a new block to the blockchain; and
the updating the database record with a credit based on the determined amount of overpayment comprises adding a new block to the blockchain.

6. The method of claim 1, wherein the updating the database record with the beginning amount of fuel when the user rents the vehicle comprises receiving, from a volume sensor of the vehicle, a detected volume of fuel in a fuel tank of the vehicle.

7. The method of claim 6, wherein the volume sensor comprises a fill level sensor that detects a level of fuel in the fuel tank and whose output is calibrated to provide a measure of volume of fuel in the fuel tank.

8. The method of claim 1, wherein the fuel purchase information includes an amount of fuel dispensed to the vehicle by the fuel dispenser, the amount of fuel being measured by a flow meter whose output is calibrated to provide a measure of a volume of fuel dispensed per unit of time.

9. The method of claim 8, wherein the fuel purchase information includes a unique identifier of the vehicle that is obtained using a camera that captures an image of a license plate of the vehicle.

10. A computer program product for determining and distributing fuel credits in a rental car return using a computer-based immutable ledger, the computer program product comprising a computer readable storage medium having program instructions embodied therewith, the program instructions executable by a computer device to cause the computer device to:
create a database record for a user in the computer-based immutable ledger, wherein the computer-based immutable ledger comprises a blockchain that is personal to the user;
update the database record with a beginning amount of fuel when the user rents a vehicle;
receive fuel purchase information from a fuel dispenser at a filling station;
update the database record with the fuel purchase information;
update the database record with an ending amount of fuel when the user returns the vehicle;
determine an amount of overpayment for fuel by the user;
update the database record with a credit based on the determined amount of overpayment;
determine a portion of the overpayment to be credited to the filling station;
update a database record of the filling station with the determined portion of the overpayment; and
derive a hash value from the fuel purchase information, wherein the updating the database record with the fuel purchase information comprises adding a new block to the blockchain of the user, the new block including:
the fuel purchase information;
the hash value derived from the fuel purchase information; and
a hash value of a previous block in the blockchain of the user.

11. The computer program product of claim 10, wherein the fuel purchase information is received from an Internet of Things device connected to the fuel dispenser at the filling station.

12. The computer program product of claim 10, wherein the program instructions cause the computer device to:
receive a request to view the database record from a user device of the user; and
transmit data to the user device to display the database record.

13. The computer program product of claim 10, wherein:
the updating the database record with the beginning amount of fuel comprises adding a new block to the blockchain;
the updating the database record with the fuel purchase information comprises adding a new block to the blockchain;
the updating the database record with the ending amount of fuel when the user returns the vehicle comprises adding a new block to the blockchain; and
the updating the database record with a credit based on the determined amount of overpayment comprises adding a new block to the blockchain.

14. The computer program product of claim 10, wherein the updating the database record with the beginning amount of fuel when the user rents the vehicle comprises receiving, from a volume sensor of the vehicle, a detected volume of fuel in a fuel tank of the vehicle.

15. A system for determining and distributing fuel credits in a rental car return using a computer-based immutable ledger, comprising:
a computer device comprising a processor, a computer readable memory, and a computer readable storage medium;
program instructions to create a database record for a user in the computer-based immutable ledger, wherein the computer-based immutable ledger comprises a blockchain that is personal to the user;
program instructions to update the database record with a beginning amount of fuel when the user rents a vehicle;
program instructions to receive fuel purchase information from a fuel dispenser at a filling station;
program instructions to update the database record with the fuel purchase information;
program instructions to update the database record with an ending amount of fuel when the user returns the vehicle;
program instructions to determine an amount of overpayment for fuel by the user;
program instructions to update the database record with a credit based on the determined amount of overpayment;
program instructions to determine a first portion of the overpayment to be credited to the filling station;

program instructions to determine a second portion of the overpayment to be credited to a rental service provider that rented the vehicle to the user;

program instructions to update a database record of the filling station with the determined first portion of the overpayment;

program instructions to update a database record of the rental service provider with the determined second portion of the overpayment; and program instructions to derive a hash value from the fuel purchase information, wherein the updating the database record with the fuel purchase information comprises adding a new block to the blockchain of the user, the new block including:
the fuel purchase information;
the hash value derived from the fuel purchase information; and
a hash value of a previous block in the blockchain of the user, wherein the program instructions are stored on the computer readable storage medium for execution by the processor via the computer readable memory.

16. The system of claim 15, wherein the fuel purchase information is received from an Internet of Things device connected to the fuel dispenser at the filling station.

17. The system of claim 15, further comprising:
program instructions to receive a request to view the database record from a user device of the user; and
program instructions to transmit data to the user device to display the database record.

18. The system of claim 15, wherein:
the updating the database record with the beginning amount of fuel comprises adding a new block to the blockchain;
the updating the database record with the fuel purchase information comprises adding a new block to the blockchain;
the updating the database record with the ending amount of fuel when the user returns the vehicle comprises adding a new block to the blockchain; and
the updating the database record with a credit based on the determined amount of overpayment comprises adding a new block to the blockchain.

19. The system of claim 15, wherein the updating the database record with the beginning amount of fuel when the user rents the vehicle comprises receiving, from a volume sensor of the vehicle, a detected volume of fuel in a fuel tank of the vehicle.

* * * * *